(12) United States Patent
Huang et al.

(10) Patent No.: US 11,709,955 B2
(45) Date of Patent: Jul. 25, 2023

(54) PROGRAMMER AND METHOD FOR ENCRYPTION PROGRAMMING

(71) Applicant: Hangzhou Vango Technologies, Inc., Zhejiang (CN)

(72) Inventors: Sufang Huang, Zhejiang (CN); Yangfan Zhou, Zhejiang (CN); Chao Fu, Zhejiang (CN); Xiaolu Liu, Zhejiang (CN)

(73) Assignee: HANGZHOU VANGO TECHNOLOGIES, INC., Zhejiang (CN)

( * ) Notice: Subject to any disclaimer, the term of this patent is extended or adjusted under 35 U.S.C. 154(b) by 388 days.

(21) Appl. No.: 17/027,745

(22) Filed: Sep. 22, 2020

(65) Prior Publication Data
US 2021/0374261 A1 Dec. 2, 2021

(30) Foreign Application Priority Data
Jun. 1, 2020 (CN) .......................... 202010485193.X

(51) Int. Cl.
*G06F 21/62* (2013.01)
*G06F 16/11* (2019.01)
*G06F 21/60* (2013.01)

(52) U.S. Cl.
CPC ........ *G06F 21/6209* (2013.01); *G06F 16/122* (2019.01); *G06F 21/602* (2013.01); *G06F 2221/2107* (2013.01)

(58) Field of Classification Search
CPC .. G06F 21/6209; G06F 21/602; G06F 16/122; G06F 2221/2107
See application file for complete search history.

(56) References Cited

U.S. PATENT DOCUMENTS

| | | | | |
|---|---|---|---|---|
| 5,933,500 A * | 8/1999 | Blatter | ................... | H04N 7/163 |
| 7,447,914 B1 * | 11/2008 | Saito | ........................ | H04N 1/44 |
| | | | | 380/279 |
| 7,555,126 B2 * | 6/2009 | Okada | ..................... | G06F 21/10 |
| | | | | 380/231 |
| 2001/0039614 A1 * | 11/2001 | Hellberg | ................. | G06F 21/10 |
| | | | | 705/59 |
| 2004/0125954 A1 * | 7/2004 | Riebe | .................... | G06F 21/125 |
| | | | | 380/231 |

(Continued)

*Primary Examiner* — Vance M Little
(74) *Attorney, Agent, or Firm* — Yue (Robert) Xu; Apex Attorneys at Law, LLP

(57) ABSTRACT

The present disclosure provides a method for encryption programming, including: selecting an encrypted programming file that matches the programmer from a target folder; loading the selected encrypted programming file; if a current number of times for programming of the programmer is greater than or equal to a maximum number of times for programming, destroying the selected encrypted programming file and ending programming; otherwise, decrypting the selected encrypted programming file; if the current number of times for programming of the programmer is less than an initial number of times for programming, replacing the current number of times for programming of the programmer with the initial number of times for programming, otherwise, re-encrypting the decrypted encrypted programming file and programing the re-encrypted programming file into a target chip. A programmer is further provided.

10 Claims, 2 Drawing Sheets

(56) References Cited

U.S. PATENT DOCUMENTS

| | | | |
|---|---|---|---|
| 2006/0069653 A1* | 3/2006 | Lelikov | G06F 21/00 |
| | | | 705/59 |
| 2006/0253400 A1* | 11/2006 | Okamoto | G06Q 30/06 |
| | | | 705/57 |
| 2009/0089593 A1* | 4/2009 | Kuno | G11B 20/00115 |
| | | | 713/193 |
| 2016/0269767 A1* | 9/2016 | Farrugia | H04N 21/47202 |

* cited by examiner

US 11,709,955 B2

PROGRAMMER AND METHOD FOR ENCRYPTION PROGRAMMING

CROSS REFERENCE OF RELATED APPLICATION

The present application claims priority to Chinese Patent Application No. 202010485193.X, titled "PROGRAMMER AND METHOD FOR ENCRYPTION PROGRAMMING", filed on Jun. 1, 2020 with the China National Intellectual Property Administration, which is incorporated herein by reference in its entirety.

FIELD

The present disclosure relates to the technical field of programming, and in particular, to a programmer and a method for encryption programming.

BACKGROUND

Currently, when encryption programming is required, a solution provider that provides an encrypted programming file usually sets a licensed number of times for programming, which is encrypted in a programmer, and then delivers the programmer to a customer, so as to perform mass programming on a production line. In a case that the number of times for programming on the production line reaches the licensed number of times for programming, if the customer still demands programming or is to program a new product, the customer has to deliver the programmer back to the solution provider for relicense or another license, which may resulting in a reduction in operation efficiency for the customer, especially resulting in a large impact on operation efficiency for a foreign customer due to a long distance.

In summary, how to effectively improve efficiency of encryption programming is a technical problem described to be solved by those skilled in the art.

SUMMARY

A programmer and a method for encryption programming are provided according to the present disclosure, so as to effectively improve the efficiency of encryption programming.

To solve the above technical problem, the following technical solutions are provided according to the present disclosure.

A method for encryption programming is provided. The method is applied to a programmer and includes:

selecting an encrypted programming file that matches the programmer from a target folder, where the target folder includes N encrypted programming files, each of the N encrypted programming files carries an initial number of times for programming and a maximum number of times for programming that are preset for said encrypted programming file, and N is a positive integer;

loading the selected encrypted programming file, and determining whether a current number of times for programming of the programmer is greater than or equal to a maximum number of times for programming carried by the selected encrypted programming file;

in a case that the current number of times for programming of the programmer is greater than or equal to the maximum number of times for programming carried by the selected encrypted programming file, destroying the selected encrypted programming file and ending programming; and in a case that the current number of times for programming of the programmer is less than the maximum number of times for programming carried by the selected encrypted programming file, decrypting the selected encrypted programming file and determining whether the current number of times for programming of the programmer is less than an initial number of times for programming carried by the selected encrypted programming file, including: in a case that the current number of times for programming of the programmer is less than the initial number of times for programming carried by the selected encrypted programming file, replacing the current number of times for programming of the programmer with the initial number of times for programming carried by the selected encrypted programming file, re-encrypting the decrypted encrypted programming file, and programing the re-encrypted programming file into a target chip; and in a case that the current number of times for programming of the programmer is greater than or equal to the initial number of times for programming carried by the selected encrypted programming file, re-encrypting the decrypted encrypted programming file and programing the re-encrypted programming file into the target chip.

Optionally, the selecting the encrypted programming file that matches the programmer from the target folder includes:

generating a key file corresponding to the programmer in a preset key encryption manner;

loading and decrypting the N encrypted programming files in the target folder one by one;

for any one of the encrypted programming files after being loaded and decrypted:

in a case that key information of said encrypted programming file does not match the generated key file, loading a next encrypted programming file; and in a case that the key information of said encrypted programming file matches the generated key file, determining said encrypted programming file as the selected encrypted programming file that matches the programmer, and re-encrypting said encrypted programming file.

Optionally, the generating the key file corresponding to the programmer in the preset key encryption manner includes:

generating a key file corresponding to an identity (ID) of the programmer in the preset key encryption manner.

Optionally, the re-encrypting the decrypted encrypted programming file and programing the re-encrypted programming file into the target chip includes:

re-encrypting the decrypted encrypted programming file in a preset secondary encryption manner, and programing the re-encrypted programming file into the target chip;

where the secondary encryption manner is different from an encryption manner used when generating the encrypted programing file.

Optionally, the N encrypted programming files are all encrypted Hex programming files.

A programmer is also provided. The programmer includes an encrypted programming file selecting module, a first determining module, a destroying module, a second determining module, a first programming module and a second programming module, where the encrypted programming file selecting module is configured to select an encrypted programming file that matches the programmer from a target folder, where target folder includes N encrypted programming files, each of the N encrypted programming files carries an initial number of times for programming and a maximum number of times for programming that are preset for said encrypted programming file, and N is a positive integer;

the first determining module is configured to load the selected encrypted programming file and determine whether a current number of times for programming of the programmer is greater than or equal to a maximum number of times for programming carried by the selected encrypted programming file;

the destroying module is triggered in a case that the current number of times for programming of the programmer is greater than or equal to the maximum number of times for programming carried by the selected encrypted programming file, and is configured to destroy the selected encrypted programming file and end programming;

the second determining module is triggered in a case that the current number of times for programming of the programmer is less than the maximum number of times for programming carried by the selected encrypted programming file, and is configured to decrypt the selected encrypted programming file and determine whether the current number of times for programming of the programmer is less than an initial number of times for programming carried by the selected encrypted programming file;

the first programming module is triggered in a case that the current number of times for programming of the programmer is less than the initial number of times for programming carried by the selected encrypted programming file, and is configured to replace the current number of times for programming of the programmer with the initial number of times for programming carried by the selected encrypted programming file, re-encrypt the decrypted encrypted programming file, and program the re-encrypted programming file into a target chip; and the second programming module is triggered in a case that the current number of times for programming of the programmer is greater than or equal to the initial number of times for programming carried by the selected encrypted programming file, and is configured to re-encrypt the decrypted encrypted programming file and program the re-encrypted programming file into the target chip.

Optionally, the encrypted programming file selecting module includes a key file generating unit and an encrypted programming file selecting unit, where the key file generating unit is configured to generate a key file corresponding to the programmer in a preset key encryption manner; and the encrypted programming file selecting unit is configured to:

load and decrypt N encrypted programming files in the target folder one by one; and for any one of the encrypted programming files after being loaded and decrypted;

in a case that key information of said encrypted programming file does not match the generated key file, load a next encrypted programming file; and in a case that key information of said encrypted programming file matches the generated key file, determine said encrypted programming file as the selected encrypted programming file that matches the programmer and re-encrypt said encrypted programming file.

Optionally, the key file generating unit is further configured to generate a key file corresponding to an identity (ID) of the programmer in the preset key encryption manner.

Optionally, the first programming module is further configured to replace the current number of times for programming of the programmer with the initial number of times for programming carried by the selected encrypted programming file, re-encrypt the decrypted encrypted programming file in a preset secondary encryption manner, and program the re-encrypted programming file into a target chip; and the second programming module is configured to re-encrypt the decrypted encrypted programming file in the preset secondary encryption manner and program the re-encrypted programming file into the target chip;

where the secondary encryption manner is different from an encryption manner used when generating the encrypted programing file.

Optionally, the N encrypted programming files are all encrypted Hex programming files.

With the technical solutions according to embodiments of the present disclosure, an initial number of times for programming and a maximum number of times for programming of an encrypted programming file are set in the encrypted programming file, thereby limiting the number of times for using the encrypted programming file. Further, with the technical solutions according to the present disclosure, security of the encrypted programming file can be endured. Specifically, a certain programmer only selects an encrypted programming file that matches the programmer from the target folder. After the encrypted programming file is selected, in a case that a current number of times for programming of the programmer is greater than or equal to the maximum number of times for programming carried by the selected encrypted programming file, it is indicated that the number of times for using the encrypted programming file in the programmer reaches a limit. The selected encrypted programming file is destroyed and the programming ends. In a case that the current number of times for programming of the programmer is less than the initial number of times for programming carried by the selected encrypted programming file, the current number of times for programming of the programmer is replaced with the initial number of times for programming carried by the selected encrypted programming file, and the decrypted encrypted programming file is re-encrypted and then is programmed into a target chip, so as to prevent an actual number of times for using the encrypted programming file from being greater than a limited number of times for using the encrypted programming file. In a case that the current number of times for programming of the programmer is not less than the initial number of times for programming carried by the selected encrypted programming file, the decrypted encrypted programming file is re-encrypted and then is programmed into the target chip. Furthermore, in the technical solutions according to the present disclosure, the decrypted encrypted programming file is re-encrypted and then is programmed into the target chip, such that security of data stored in the programmer and security of data programmed into the target chip can be ensured. In summary, with the technical solutions according to the present disclosure, the number of times for using the encrypted programming file can be limited. In a case that a customer still demands programming or is to program a new product, a solution provider only delivers a newly set encrypted programming file to the customer without requiring the customer to deliver the programmer back to the solution provider as in the conventional solutions. Therefore, with the technical solutions according to the present disclosure, the efficiency of encryption programming can be effectively improved while ensuring the security of the encrypted programming file.

BRIEF DESCRIPTION OF THE DRAWINGS

In order to more clearly illustrate technical solutions in embodiments of the present disclosure or in the conventional technology, the drawings to be used in the description of the embodiments or the conventional technology are briefly described below. Apparently, the drawings in the following description show only some embodiments of the present disclosure, and other drawings may be obtained by those skilled in the art from the drawings without any creative work.

DETAILED DESCRIPTION OF THE EMBODIMENTS

A core of the present disclosure is to provide a method for encryption programming, so as to effectively improve efficiency of encryption programming.

For a better understanding of technical solutions of the present disclosure by those skilled in the art, the present disclosure is further described in detail below with reference to the drawings and specific embodiments. It is apparent that the embodiments described herein are only some rather than all of embodiments of the present disclosure. Based on the embodiments of the present disclosure, all other embodiments obtained by those skilled in the art without any creative work should fall within the protection scope of the present disclosure.

Figure 1:
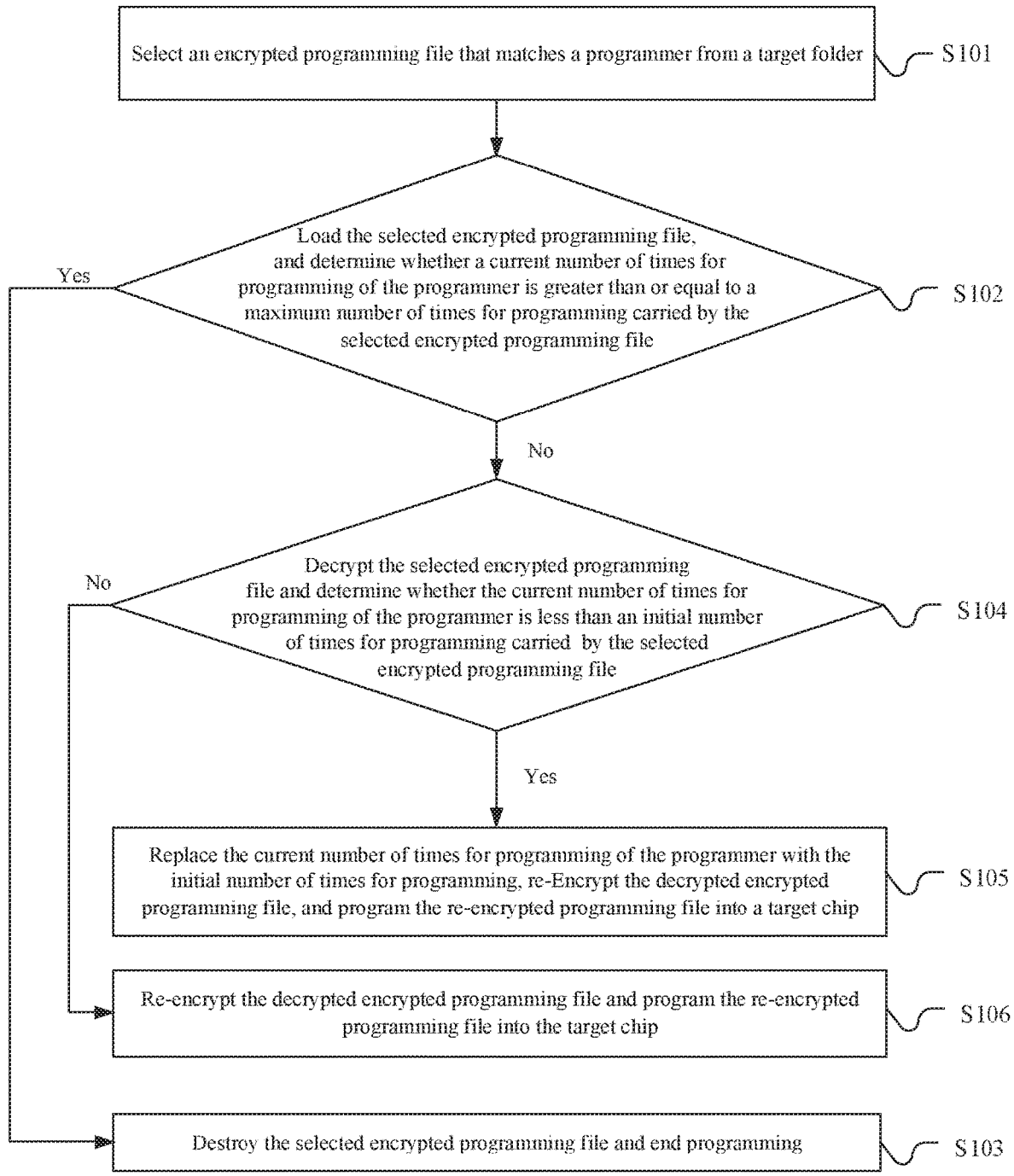
FIG. 1 is an implementation flowchart of a method for encryption programming according to the present disclosure.

Reference is made to FIG. 1, which is an implementation flowchart of a method for encryption programming according to the present disclosure. The method is applied to a programmer and may include the following steps S101 to S106.

In step S101, an encrypted programming file that matches the programmer is selected from a target folder.

The target folder includes N encrypted programming files. Each of the N encrypted programming files carries an initial number of times for programming and a maximum number of times for programming that are preset for said encrypted programming file, and N is a positive integer.

In practical applications, a customer usually uses multiple programmers to program a target chip on a production line. Thus, N is usually greater than 1.

The encrypted programming files are usually encrypted Hex programming files. In other specific embodiments, the encrypted programming files may be other types of encrypted programming files, which do not affect implementations of the present disclosure.

For example, in a specific scenario, in a case that the customer has 10 programmers to program a Hex file, the target folder may include 10 encrypted programming files respectively corresponding to the 10 programmers.

Further, it is understood that each encrypted programming file corresponds to one programmer. Thus, the solution provider is required to encrypt a programming file based on information of a programmer corresponding to the programming file, to obtain the encrypted programming file. The information of the programmer is required to be unique to the programmer and is different from that of other programmers. For example, considering that identity (ID) numbers of programmers are different from each other, the IDs of these programmers may serve as key files, and then programming files are encrypted based on different key files, so as to obtain encrypted programming files respectively corresponding to the programmers.

Further, in a specific embodiment of the present disclosure, step S101 may include the following first and second steps.

In a first step, a key file corresponding to the programmer is generated in a preset key encryption manner.

In a second step, the N encrypted programming files in the target folder are loaded and decrypted one by one. For any one of the encrypted programming files after being loaded and decrypted, a next encrypted programming file is loaded in a case that key information of said encrypted programming file does not match the generated key file. For any one of the encrypted programming files after being loaded and decrypted, said encrypted programming file is determined as the selected encrypted programming file that matches the programmer and is re-encrypted, in a case that key information of the encrypted programming file matches the generated key file.

In a specific embodiment of the present disclosure, the first step may include: generating a key file corresponding to an ID of the programmer in the preset key encryption manner.

In other scenarios, as long as programmers can be distinguished from each other, the key file may be generated based on other information of the programmer instead of the ID of the programmer. It is relatively simple and convenient to distinguish programmers from each other based on their IDs.

Further, it should be emphasized that in this embodiment, information of the programmer is not directly used as the key file. For example, in a case that the information of the programmer is the ID of the programmer, the ID of the programmer is not directly used as the key file in this embodiment. Instead, the ID of the programmer is encrypted in the preset key encryption manner, so as to generate a key file corresponding to the ID of the programmer. That is, the key file is also encrypted. This double encryption is beneficial to further improve the security of the solutions, that is, to protect the encrypted programming file of the solution provider, and reduce probability of abnormal decryption.

In order to facilitate the understanding of the solutions, a process of generating an encrypted programming file is described briefly. For example, in the foregoing example, in a case that the customer has 10 programmers to program a Hex file, the target folder may include 10 encrypted programming files. These 10 encrypted programming files are generated by the solution provider encrypting an unencrypted Hex file using 10 key files in a preset first encryption manner. These 10 key files are obtained by the solution provider based on information of the 10 programmers. For example, the IDs of the 10 programmers are directly used as the key files. Alternatively, as described in the foregoing embodiment, the IDs of the programmer are encrypted to be used as the key files.

Correspondingly, for a certain programmer, the key encryption manner used to generate the key file in the first step should be the same as the key encryption manner used by the solution provider to generate the key file. The encrypted programming files in the target folder are loaded and decrypted one by one in a first decryption manner corresponding to the first encryption manner.

It is understandable that for a certain programmer, only one encrypted programming file in the target folder can be correctly decrypted by the programmer, and other encrypted programming files cannot be decrypted by the programmer successfully. For the encrypted programming file that is successfully decrypted by the programmer, key information of the encrypted programming file matches the key file generated by the programmer. The programmer determines this encrypted programming file as the selected encrypted programming file that matches the programmer, and re-encrypts the decrypted encrypted programming file. Further, it should be noted that the decrypted encrypted programming file is re-encrypted by the programmer here, so that security of data stored in the programmer can be ensured. That is, a decrypted programming file is not allowed to be stored in the programmer. This encryption operation may be the same as the operation of generating the encrypted programming files, that is, based on the first encryption manner, the decrypted programming file is re-encrypted in the preset first encryption manner, to obtain the re-encrypted programming file, and then step S102 is performed.

In addition, in this embodiment, the customer is required to select a path of the target folder only. The programmer automatically selects the encrypted programming file that matches the programmer from the target folder. In this way, a case that the customer selects an encrypted programming file that does not match the programmer can be avoided. Furthermore, data security of the solution provider can be ensured. That is, for each encrypted programming file in the target folder, the customer cannot know which specific programmer matches the encrypted programming file, thereby reducing the probability that the encrypted programming file is abnormally decrypted by the customer.

In step S102, the selected encrypted programming file is loaded, and it is determined whether a current number of times for programming of the programmer is greater than or equal to the maximum number of times for programming carried by the selected encrypted programming file.

In a case that the current number of times for programming of the programmer is greater than or equal to the maximum number of times for programming, step S103 is performed. In a case that the current number of times for programming of the programmer is less than the maximum number of times for programming, step S104 is performed.

In step S103, the selected encrypted programming file is destroyed and programming ends.

Each encrypted programming file carries an initial number of times for programming and a maximum number of times for programming that are preset for the encrypted programming file, so as to limit the number of times for using the encrypted programming file.

Therefore, in a case that the current number of times for programming of the programmer is determined as greater than or equal to the maximum number of times for programming carried by the selected encrypted programming file, the selected encrypted programming file is required to be destroyed and the programming is required to be ended. The current number of times for programming of the programmer is stored in the programmer, and is automatically increased by 1 each time the programmer successfully performs one programming process.

In step S104, the selected encrypted programming file is decrypted, and it is determined whether the current number of times for programming of the programmer is less than the initial number of times for programming carried by the selected encrypted programming file.

In a case that the current number of times for programming of the programmer is determined as less than the initial number of times for programming carried by the selected encrypted programming file, step S105 is performed. In a case that the current number of times for programming of the programmer is determined as not less than the initial number of times for programming carried by the selected encrypted programming file, step S106 is performed.

In step S105, the current number of times for programming of the programmer is replaced with the initial number of times for programming carried by the selected encrypted programming file. The decrypted encrypted programming file is re-encrypted and then is programmed into a target chip.

In step S106, the decrypted encrypted programming file is re-encrypted and then is programmed into the target chip.

In practical applications, the current number of times for programming of the programmer is unlikely less than the initial number of times for programming carried by the selected encrypted programming file, since the initial number of times for programming and the maximum number of times for programming are set by the solution provider based on current programming information of the programmer.

For example, the customer has 10 programmers, and it is assumed that the current number of times for programming of each programmer is 26. After the solution provider communicates with the customer, the customer expects each programmer to be able to perform programming 15 times. For each of 10 encrypted programming files, the solution provider set an initial number of times for programming to be 26, and a maximum number of times for programming to be 41.

It is considered that the current number of times for programming of the programmer provided by the customer may be incorrect. Therefore, in a case that the current number of times for programming of a programmer is less than an initial number of times for programming carried by the selected encrypted programming file, the current number of times for programming of the programmer may be replaced with the initial number of times for programming carried by the selected encrypted programming file, so that an actual number of times for using the encrypted programming file can be not greater than a preset licensed number of times for using the encrypted programming file, that is, the solution provider is protected from loss.

Further, in a specific embodiment of the present disclosure, the decrypted encrypted programming file is re-encrypted and then is programmed into the target chip in step S105 or S106 may be performed as follows. The decrypted encrypted programming file is re-encrypted in a preset secondary encryption manner, and the secondary encrypted programming file is programed into the target chip. The secondary encryption manner is different from the encryption manner used when generating the encrypted programing file.

In the above description, the encryption manner used when generating the encrypted programing file based on the key file is referred to as a first encryption manner. In this embodiment, the decrypted encrypted programming file is re-encrypted in the secondary encryption manner different from the first encryption manner and then is programed into the target chip, so that the customer cannot know which encrypted programming file in the target folder corresponds to the secondary encrypted programming file stored in the programmer, thereby further ensuring the security of the solutions. That is, the security of the data stored in the programmer and the security of the data programmed into the target chip can be ensured.

In addition, it should be pointed out that the programmer described in the present disclosure may perform encryption programming or perform non-encryption programming, and also supports encryption programming without limiting the licensed number of times for programming.

For example, the solution provider may determine whether to set an initial number of times for programming and a maximum number of times for programming as needed. If the initial number of times for programming and the maximum number of times for programming are required, it is indicated that the licensed number of times for programming is required to be limited for the customer. However, in actual applications, the licensed number of times for programming may not be limited for some customers. Therefore, the encrypted programming file may not carry the initial number of times for programming and the maximum number of times for programming. Correspondingly, after selecting the encrypted programming file that matches the programmer from the target folder and finding that the selected encrypted programming file does not carry an initial number of times for programming and a maximum number of times for programming, the programmer directly performs the step S106 in which the decrypted encrypted programming file is re-encrypted and then is programmed into the target chip. Generally, the decrypted encrypted programming file may be re-encrypted in the preset secondary encryption manner in step S106.

With the technical solutions according to embodiments of the present disclosure, an initial number of times for programming and a maximum number of times for programming of an encrypted programming file are set in the encrypted programming file, thereby limiting the number of times for using the encrypted programming file. Further, with the technical solutions according to the present disclosure, security of the encrypted programming file can be endured. Specifically, a certain programmer only selects an encrypted programming file that matches the programmer from the target folder. After the encrypted programming file is selected, in a case that a current number of times for programming of the programmer is greater than or equal to the maximum number of times for programming carried by the selected encrypted programming file, it is indicated that the number of times for using the encrypted programming file in the programmer reaches a limit. The selected encrypted programming file is destroyed and the programming ends. In a case that the current number of times for programming of the programmer is less than the initial number of times for programming carried by the selected encrypted programming file, the current number of times for programming of the programmer is replaced with the initial number of times for programming carried by the selected encrypted programming file, and the decrypted encrypted programming file is re-encrypted and then is programmed into a target chip, so as to prevent an actual number of times for using the encrypted programming file from being greater than a limited number of times for using the encrypted programming file. In a case that the current number of times for programming of the programmer is not less than the initial number of times for programming carried by the selected encrypted programming file, the decrypted encrypted programming file is re-encrypted and then is programmed into the target chip. Furthermore, in the technical solutions according to the present disclosure, the decrypted encrypted programming file is re-encrypted and then is programmed into the target chip, such that security of data stored in the programmer and security of data programmed into the target chip can be ensured. In summary, with the technical solutions according to the present disclosure, the number of times for using the encrypted programming file can be limited. In a case that a customer still demands programming or is to program a new product, a solution provider only delivers a newly set encrypted programming file to the customer without requiring the customer to deliver the programmer back to the solution provider as in the conventional solutions. Therefore, with the technical solutions according to the present disclosure, the efficiency of encryption programming can be effectively improved while ensuring the security of the encrypted programming file.

Corresponding to the method for encryption programming according to the above embodiments, a programmer is further provided according to an embodiment of the present disclosure. The above method and the programmer may refer to each other.

Figure 2:
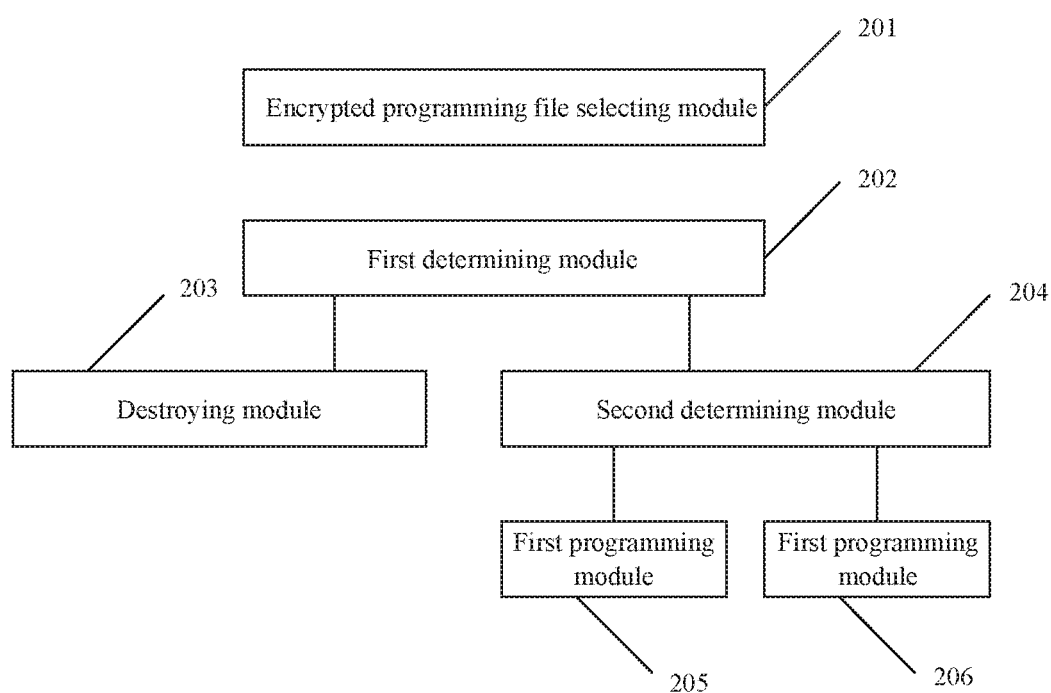
FIG. 2 is a schematic structural diagram of a programmer according to the present disclosure.

Reference is made to FIG. 2, which is a schematic structural diagram of a programmer according to the present disclosure. The programmer includes an encrypted programming file selecting module 201, a first determining module 202, a destroying module 203, a second determining module 204, a first programming module 205 and a second programming module 206.

The encrypted programming file selecting module 201 is configured to select an encrypted programming file that matches the programmer from a target folder. The target folder includes N encrypted programming files. Each of the encrypted programming files carries an initial number of times for programming and a maximum number of times for programming that are preset for said encrypted programming file, and N is a positive integer.

The first determining module 202 is configured to load the selected encrypted programming file and determine whether a current number of times for programming of the programmer is greater than or equal to the maximum number of times for programming carried by the selected encrypted programming file.

The destroying module 203 is triggered in a case that the current number of times for programming of the programmer is greater than or equal to the maximum number of times for programming carried by the selected encrypted programming file. The destroying module 203 is configured to destroy the selected encrypted programming file and end programming.

The second determining module 204 is triggered in a case that the current number of times for programming of the programmer is less than the maximum number of times for programming carried by the selected encrypted programming file. The second determining module 204 is configured to decrypt the selected encrypted programming file and determine whether the current number of times for programming of the programmer is less than an initial number of times for programming carried by the selected encrypted programming file.

The first programming module 205 is triggered in a case that the current number of times for programming of the programmer is less than the initial number of times for programming carried by the selected encrypted programming file. The first programming module 205 is configured to replace the current number of times for programming of the programmer with the initial number of times for programming carried by the selected encrypted programming file, re-encrypt the decrypted encrypted programming file, and program the re-encrypted programming file into a target chip.

The second programming module 206 is triggered in a case that the current number of times for programming of the programmer is not less than the initial number of times for programming carried by the selected encrypted programming file. The second programming module 206 is configured to re-encrypt the decrypted encrypted programming file and program the re-encrypted programming file into the target chip.

In a specific embodiment of the present disclosure, the encrypted programming file selecting module 201 includes a key file generating unit and an encrypted programming file selecting unit.

The key file generating unit is configured to generate a key file corresponding to the programmer in a preset key encryption manner.

The encrypted programming file selecting unit is configured to: load and decrypt N encrypted programming files in the target folder one by one; and for any one of the encrypted programming files after being loaded and decrypted, load a next encrypted programming file in a case that key information of said encrypted programming file does not match the generated key file, and determine said encrypted programming file as the selected encrypted programming file that matches the programmer and re-encrypt said encrypted programming file in a case that key information of said encrypted programming file matches the generated key file.

In a specific embodiment of the present disclosure, the key file generating unit is further configured to generate a key file corresponding to an ID of the programmer in the preset key encryption manner.

In a specific embodiment of the present disclosure, the first programming module 205 is further configured to replace the current number of times for programming of the programmer with the initial number of times for programming carried by the selected encrypted programming file, re-encrypt the decrypted encrypted programming file in a preset secondary encryption manner, and program the re-encrypted programming file into a target chip. The second programming module 206 is configured to re-encrypt the decrypted encrypted programming file in the preset secondary encryption manner and program the re-encrypted programming file into the target chip. The secondary encryption manner is different from an encryption manner used when generating the encrypted programing file.

In a specific embodiment of the present disclosure, the N encrypted programming files are all encrypted Hex programming files.

It should be further noted that relationship terminologies such as first, second or the like are only used herein to distinguish one entity or operation from another, rather than to necessitate or imply that the actual relationship or order exists between the entities or operations. Furthermore, terms of "include", "comprise" or any other variants thereof are intended to be non-exclusive. Therefore, a process, method, article or device including a series of elements includes not only the elements but also other elements that are not enumerated, or also includes elements inherent for the process, method, article or device. Unless expressively limited otherwise, an element defined by a statement "comprising one . . . " does not exclude the case that other identical elements may exist in the process, method, article or device including the element.

It is to be further understood by those skilled in the art that units and algorithm steps in examples described in combination with the disclosed embodiments may be implemented by electronic hardware, computer software or a combination thereof. In order to clearly describe interchangeability of the hardware and the software, the units and steps in the examples are generally described above based on functions. Whether the functions are realized by the hardware or the software is determined by specific applications of the technical solutions and design constraints. For each of the specific applications, those skilled in the art may adopt a specific implementation to realize the functions described above, and the implementation should fall within the scope of the present disclosure.

Specific examples are used herein to explain the principle and embodiments of the present disclosure, and the above description of the embodiments is only used to facilitate understanding of the technical solutions and core concept of the present disclosure. It should be pointed out that for those skilled in the art, various improvements and modifications may be made without departing from the principle of the present disclosure, and these improvements and modifications should fall within the protection scope of the present disclosure.

The invention claimed is:

1. A method for encryption programming, applied to a programmer, and the method comprising:
 selecting an encrypted programming file that matches the programmer from a target folder, wherein the target folder comprises N encrypted programming files, each of the N encrypted programming files carries an initial number of times for programming and a maximum number of times for programming that are preset for said encrypted programming file, and N is a positive integer;
 loading the selected encrypted programming file, and determining whether a current number of times for programming of the programmer is greater than or equal to a maximum number of times for programming carried by the selected encrypted programming file;
 in a case that the current number of times for programming of the programmer is greater than or equal to the maximum number of times for programming carried by the selected encrypted programming file, destroying the selected encrypted programming file and ending programming; and
 in a case that the current number of times for programming of the programmer is less than the maximum number of times for programming carried by the selected encrypted programming file, decrypting the selected encrypted programming file and determining whether the current number of times for programming of the programmer is less than an initial number of times for programming carried by the selected encrypted programming file, comprising:
  in a case that the current number of times for programming of the programmer is less than the initial number of times for programming carried by the selected encrypted programming file, replacing the current number of times for programming of the programmer with the initial number of times for programming carried by the selected encrypted programming file, re-encrypting the decrypted encrypted programming file, and programing the re-encrypted programming file into a target chip; and
  in a case that the current number of times for programming of the programmer is greater than or equal to the initial number of times for programming carried by the selected encrypted programming file, re-encrypting the decrypted encrypted programming file and programing the re-encrypted programming file into the target chip.

2. The method for encryption programming according to claim 1, wherein the selecting the encrypted programming file that matches the programmer from the target folder comprises:

generating a key file corresponding to the programmer in a preset key encryption manner;

loading and decrypting the N encrypted programming files in the target folder one by one;

for any one of the encrypted programming files after being loaded and decrypted:

in a case that key information of said encrypted programming file does not match the generated key file, loading a next encrypted programming file; and in a case that the key information of said encrypted programming file matches the generated key file, determining said encrypted programming file as the selected encrypted programming file that matches the programmer, and re-encrypting said encrypted programming file.

3. The method for encryption programming according to claim 2, wherein the generating the key file corresponding to the programmer in the preset key encryption manner comprises:

generating a key file corresponding to an identity (ID) of the programmer in the preset key encryption manner.

4. The method for encryption programming according to claim 1, wherein the re-encrypting the decrypted encrypted programming file and programing the re-encrypted programming file into the target chip comprises:

re-encrypting the decrypted encrypted programming file in a preset secondary encryption manner; and programing the re-encrypted programming file into the target chip;

wherein the secondary encryption manner is different from an encryption manner used when generating the encrypted programing file.

5. The method for encryption programming according to claim 1, the N encrypted programming files are all encrypted Hex programming files.

6. A programmer, comprising a processor and a memory, the memory storing at least one program code, the at least one program code being loaded and executed by the processor to:

select an encrypted programming file that matches the programmer from a target folder, wherein the target folder comprises N encrypted programming files, each of the N encrypted programming files carries an initial number of times for programming and a maximum number of times for programming that are preset for said encrypted programming file, and N is a positive integer;

load the selected encrypted programming file and determine whether a current number of times for programming of the programmer is greater than or equal to a maximum number of times for programming carried by the selected encrypted programming file;

in a case that the current number of times for programming of the programmer is greater than or equal to the maximum number of times for programming carried by the selected encrypted programming file, destroy the selected encrypted programming file and end programming;

in a case that the current number of times for programming of the programmer is less than the maximum number of times for programming carried by the selected encrypted programming file, decrypt the selected encrypted programming file and determine whether the current number of times for programming of the programmer is less than an initial number of times for programming carried by the selected encrypted programming file;

in a case that the current number of times for programming of the programmer is less than the initial number of times for programming carried by the selected encrypted programming file, replace the current number of times for programming of the programmer with the initial number of times for programming carried by the selected encrypted programming file, re-encrypt the decrypted encrypted programming file, and program the re-encrypted programming file into a target chip; and in a case that the current number of times for programming of the programmer is greater than or equal to the initial number of times for programming carried by the selected encrypted programming file, re-encrypt the decrypted encrypted programming file and program the re-encrypted programming file into the target chip.

7. The programmer according to claim 6, wherein the at least one program code is loaded and executed by the processor to:

generate a key file corresponding to the programmer in a preset key encryption manner; and load and decrypt the N encrypted programming files in the target folder one by one;

for any one of the encrypted programming files after being loaded and decrypted:

in a case that key information of said encrypted programming file does not match the generated key file, load a next encrypted programming file; and in a case that key information of said encrypted programming file matches the generated key file, determine said encrypted programming file as the selected encrypted programming file that matches the programmer and re-encrypt said encrypted programming file.

8. The programmer according to claim 7, wherein the at least one program code is loaded and executed by the processor to generate a key file corresponding to an identity (ID) of the programmer in the preset key encryption manner.

9. The programmer according to claim 6, wherein the at least one program code is loaded and executed by the processor to:

replace the current number of times for programming of the programmer with the initial number of times for programming carried by the selected encrypted programming file, re-encrypt the decrypted encrypted programming file in a preset secondary encryption manner, and program the re-encrypted programming file into a target chip; and re encrypt the decrypted encrypted programming file in the preset secondary encryption manner and program the re-encrypted programming file into the target chip;

wherein the secondary encryption manner is different from an encryption manner used when generating the encrypted programing file.

10. The programmer according to claim 6, wherein the N encrypted programming files are all encrypted Hex programming files.

* * * * *